I. T. DYER & G. POWELL.
Drip-Troughs for Ice-Boxes.

No. 164,983. Patented June 29, 1875.

Witnesses
Jno. H Hawley
O. H. Adix

Inventors.
Isaac T. Dyer.
George Powell.
By G. L. Chapin, Atty.

THE GRAPHIC CO. PHOTO-LITH. 39 & 41 PARK PLACE, N.Y.

UNITED STATES PATENT OFFICE.

ISAAC T. DYER AND GEORGE POWELL, OF STREATOR, ILLINOIS.

IMPROVEMENT IN DRIP-TROUGHS FOR ICE-BOXES.

Specification forming part of Letters Patent No. 164,983, dated June 29, 1875; application filed April 26, 1875.

*To all whom it may concern:*

Be it known that we, ISAAC T. DYER and GEORGE POWELL, of Streator, in the county of La Salle and State of Illinois, have invented a new and useful Improvement in Draining-Troughs for Ice-Boxes, of which the following is a specification:

The nature of the present invention consists in a series of removable troughs placed below the ice-chamber, and arranged with reference to each other so as to permit a free passage of cold from the ice to the cooling-chamber below, and at the same time convey the drippings from the ice into a trough, from which they are conveyed to a suitable receptacle. The troughs are removable for the purpose of cleaning them of sawdust or other substance which may accumulate thereon, as the whole is hereinafter shown and described.

Figure 1:
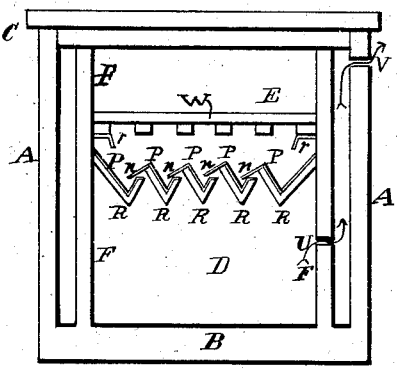
Figure 2:
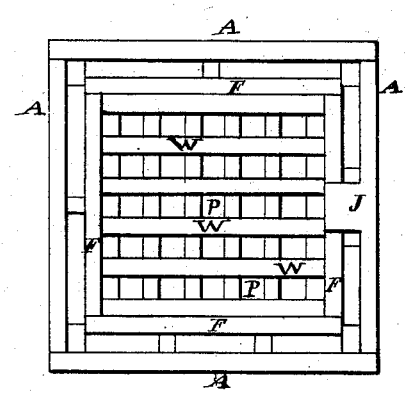
Figure 3:
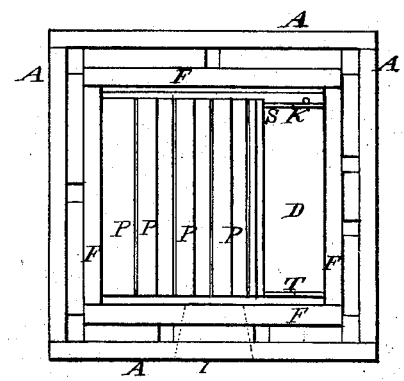
Figure 4:
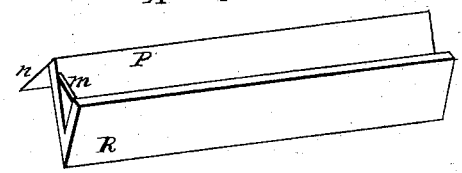

In the drawings, Figure 1 is a vertical sectional elevation of our improvement in ice-boxes, taken on dotted line $x\ x$, Fig. 2. Fig. 2 is a horizontal section thereof, taken on line $z\ z$, Fig. 1; Fig. 3, a horizontal section taken on line $w$, Fig. 1; Fig 4, an enlarged perspective view of one of the troughs removed from the ice-box.

A represents the sides, B the bottom, and C the top, of the outer case of the ice-box, which is to be constructed of wood, in the ordinary manner, and provided with doors for communicating with the cooling-chamber D and ice-chamber E, also in the ordinary manner. F represents the inner casing of the box, which is to be made of wood, and placed so far from the outer case as to give room for filling the space between them with a suitable non-conducting substance in the usual manner of protecting ice-houses, boxes, and refrigerators from outside heated air. P represents a series of metal troughs, which overlap each other at $n$, to prevent the drippings from the ice from falling into the cooling-chamber D. These troughs incline toward a discharge-trough, K, and they are supported by bearers T S, secured to the inside of the ice-box, notches conforming to the contour of the under sides of the troughs being formed in the bearers for that purpose. The ends at $m$ of the troughs are closed, so as to prevent water from escaping in the wrong direction. To guide the water at the sides of the box into the troughs P, guide-plates $r$ are fixed to the box at the under side of the ice-rack W. As shown at Fig. 3, the troughs do not extend wholly across the box from F to F. This construction is necessary to enable the troughs to be moved endwise far enough to be released from the bearer T, so as to be removed into the cooling-chamber D, and taken out at a door, I, Fig. 3, and be cleaned of sawdust and other impure substances to a greater or less extent contained in or on ice.

This construction of troughs enables all of the water to be carried to the trough K, from whence it can be disposed of in any desired manner, while at the same time cold air from the ice-chamber E may readily pass into the cooling-chamber by means of the spaces between the troughs. The warm air from the cooling-chamber D may escape through ports U V.

For large cooling-rooms or ice-boxes, a double set of troughs may be employed, and have a middle support in the box, so as to drain water in two directions.

We are aware that there was patented to Jeremiah Rohrer, December 12, 1871, a refrigerator, in which were arranged a double series of draining-slots, centrally connected over a trough; but our device differs from said patent in the form of the troughs, whereby they overlap each other and are removable. A further difference is, that our troughs are not centrally located over a draining-trough.

In the patent to same party, October 14, 1873, draining-slots are shown; but their construction is different, in that they do not overlap, nor are they removable for cleaning them from sawdust and other substances. Further, we do not cool by drip-water, as is done in the patent.

In Thomas D. Kingman's patent of September 16, 1873, troughs are combined with an ice-rest in one piece; but this is not removable, and is unlike our device in the overlapping troughs to prevent dripping of water between them.

We claim and desire to secure by Letters Patent—

The removable troughs P, provided with closed ends *m*, and overlapping each other, in combination with guide-plates *r*, bearers T S, discharge-trough K, and ice-box, as and for the purpose set forth.

ISAAC T. DYER.
GEORGE POWELL.

Witnesses:
MARTIN STONEHOCKER,
J. J. DOOLITTLE.